Patented Mar. 22, 1938

2,112,189

UNITED STATES PATENT OFFICE 2,112,189

METHOD OF MAKING FINELY DIVIDED METAL COMPOUNDS

Paul Beyersdorfer, Reichenbach (Oberlausitz), Germany, assignor to Chemische Werke Schuster & Wilhelmy Patentverwertungs-Gesellschaft m. b. H., Berlin, Germany, a corporation of Germany No Drawing. Application July 20, 1933, Serial No. 681,370. Renewed June 10, 1936. In Germany July 21, 1932

21 Claims. (Cl. 23—146)

This invention relates to the manufacture of finely divided metal oxides and other metal compounds by means of a molten metallic raw material and a fine grained solid and hard substance. The invention consists in a new and improved economic process of this kind, in which the reaction takes place much more intensively and rapidly than in any of the hitherto known or usual processes.

An important object of the invention is to divide the metallic raw material in such a manner that each particle of the material has somewhat the form of a thin leaf or scale. The formation of particles in spherical form is avoided as far as possible.

The process according to the invention is characterized by the step of mixing the whole quantity of the molten metallic raw material with a corresponding quantity of said substance so as to form a fine grained bulk which contains substantially the whole of said molten material in the form of a thin foil upon the separate grains and subjecting said fine grained bulk to a chemical reaction by which the desired metal compound is obtained, the mixing and the chemical reaction being performed at a temperature lying between the melting-temperature of said raw material and the melting-temperature of said grained substance. As raw material it is possible to employ either the pure metal or a metal compound or alloy. In most cases the reaction component is selected from a group comprising air, oxygen, and steam. In many cases, however, a solid oxidizing agent may be employed. The fine grained solid and hard substance by means of which the molten metallic raw material is brought to the desired state of very fine division is selected from a group comprising minerals of the type of sand and gravel stone silicates, glass, porcelain, metals, metal compounds and metal alloys which are substantially non-reactive with the molten raw material. Also a fine grained substance having an accelerating effect on the reaction also may be employed. This effect, however, can be obtained by addition of one or more suitable catalysts, for example, by employing a hard but porous material which is impregnated with metal salts having an accelerating action.

The separation of the metal compound from the fine grained solid substance may be effected by physical methods as sifting, centrifuging or sludging, whereby the finely divided state of the metal compound is retained. In the case in which particles of the raw material remain adhering to the separated fine grained solid substance, the recovered substance can be effectively employed for making a new mixture of molten metallic raw material and the said fine grained substance, so that a continuous process is possible.

The reaction temperature is preferably so chosen that it lies not more than about 100° above the melting point of the raw material. If the metal oxide occurs in different modifications as, for example, is the case with lead oxide which has a conversion at 586° C., the temperature range must be that in which the modification desired is stable.

In the manufacture of red lead ($Pb_3O_4$), by the method according to the invention, a considerable acceleration of the oxidation process is obtained if in the dispersion of the melted or melting lead with the fine grained solid material, such as sand, the pressure of the gaseous oxidizing agent for example air or oxygen, is raised. Even when the pressure is raised only to 1½ atmospheres the time in which the oxidation is completed diminishes to about one tenth part of the time which the whole process would take without increase of pressure. Moreover, the product is of better quality. Experiments have shown that the red lead obtained with increase of pressure practically reaches the theoretical yield. It is moreover surprising that even when oxygen is employed as the oxidizing agent, the oxidation process does not, as might be expected, lead to the formation of $PbO_2$, but stops at the degree of oxidation $Pb_3O_4$ (red lead). The new method thus leads to a simple and comparatively cheap method of obtaining a valuable and highly dispersed red lead.

It is necessary if there is an economic requirement, not to carry the method according to the invention through to the actually obtainable degree of purity of the red lead but the oxidation may be stopped earlier whereby time is saved and a red lead is obtained which contains a smaller quantity of $PbO_2$. If this low percentage red lead is treated according to a further feature of the invention in a suitable manner with acetic acid, the lead oxide which is not bound to $PbO_2$, that is the lead oxide which is not present as red lead, is obtained as lead acetate and a high percentage red lead is left. This treatment with acetic acid may extend to the dispersion itself or preferably to the lead oxide separated from the dispersion. In each case a red lead is obtained with a high content of $PbO_2$ and also the quantity equivalent to the removed lead oxides of lead acetate.

*Example I*

200 kg. of sand and 200 kg. of metallic lead are heated together above the melting point of the lead in a container with agitating device. When the lead is melted, the agitator is started; this may consist of a slowly rotating device provided with stirrer arms. After about ½ to 1 hour the lead will have covered the separate grains of sand with a lead foil. Air is admitted and the mixture is further agitated at a temperature between 400° and 500° C. After about 20 hours the greater part of the lead is converted into red lead which is visible through the red to orange colour of the sand. The red lead so obtained is separated by sifting from the sand which can then be used again for a new operation. The yield is about 99% of the theoretical yield. The method can be carried out in the same manner if instead of heating lead and sand together the molten lead is allowed to flow over the sand heated to 400–600° C.

*Example II*

Antimony sulphide (melting point 550° C.) is mixed with an equal weight of sand and agitated while air is supplied at a temperature about 100° above the melting point of the antimony. Sulphur dioxide is produced and solid antimony oxide of a melting point 656° C., which, as in the previous example can be separated from the dispersing agent such as sand or gravel by sifting. The yield is the same as in the previous example.

*Example III*

120 parts by weight of antimony are alloyed with 310 parts of lead. This alloy is dispersed with 400 parts of sand at a temperature somewhat above 300° C. As soon as the dispersion is completed 600–700 parts of Chile nitre as solid oxidizing agent are added with further stirring. The fused nitre oxidizes antimony and lead to lead antimonite, the so-called Naples yellow. This is separated from the sand by sifting and freed from sodium salt by washing.

*Example IV*

The manufacture of zinc oxide is effected according to the same method as described, in Example I, employing zinc metal with a melting point of 419° C. The dispersing agent, however, is not sand but granulated iron because the silica of the sand would be partly reduced to elementary Si in the thermic reaction.

*Example V*

If in Example III, instead of sand, unglazed porous stoneware or porcelain grit impregnated with ferric chloride solution and dried is used, reaction proceeds more rapidly and the yellow is more intensive.

*Example VI*

500 kg. of sand—grain 0.1–0.2 mm.—are heated in a suitable device with agitator to about 400°. As soon as the sand has reached this temperature it has 500 kg. of molten lead poured over it while further stirred with admission of air. After about an hour the whole of the lead will have covered the separate grains of sand with thin scales of lead. By the atmospheric air, just supplied, the lead scales are oxidized. After about three hours, counted from the introduction of the lead, the lead is more or less completely oxidized which is indicated by a yellow brown colouration of the dispersion.

In order to complete the oxidation of the lead to red lead in a short time this dispersion is conveyed to a suitable other vessel with agitator which can be closed in an air-tight manner and in which with an excess pressure of oxygen of 1.5 atmospheres with a temperature of about 400° C., the dispersion is further treated for about three hours. The finished sand-red-lead-dispersion is finally separated into sand and red lead by a sifting device, the mesh of which is smaller than the grain of the sand. The sand remaining on the sieve is used for making a new dispersion. Losses of red lead are thus avoided. The yield is nearly theoretical.

*Example VII*

The process is at first the same as in the previous example. The oxidation, however, is not carried on up to formation of 100° red lead but stops at a previous lower stage of oxidation, for example, with a content of the lead component of the dispersion of 15% $PbO_2$ corresponding to about 44% red lead. The lead oxides are separated by sifting from the sand and treated with approximately 30% acetic acid. The lower oxides come into solution as lead acetate while the red lead remains undissolved. The remaining red lead, which has a very high degree of dispersion, is dried; the lead acetate solution is worked up in a known manner to solid sugar of lead.

What I claim is:

1. In a process for making finely divided metal-oxides and other metal compounds by means of a molten metallic raw material and a fine grained solid and hard substance the step of mixing the whole quantity of the molten metallic raw material with a corresponding quantity of said substance so as to form a fine grained bulk which contains substantially the whole of said molten material in the form of a thin foil upon the separate grains and subjecting said fine grained bulk to a chemical reaction by which the desired metal compound is obtained, the mixing and the chemical reaction being performed at a temperature lying between the melting-temperature of said raw material and the melting-temperature of said grained substance.

2. In a process as claimed in claim 1, the further step of employing as a reaction component, an oxidizing agent, selected from a group consisting of air, steam and solid oxidizing substance.

3. In a process as claimed in claim 1 in which the fine grained solid and hard substance is selected from a group consisting of minerals of the type of sand and gravel, stone, silicates, glass, porcelain, metals, metal compounds and metal alloys which are substantially non-reactive with the molten raw material.

4. In a process as claimed in claim 1, the step of employing a fine grained substance having an accelerating effect on the reaction.

5. In a process as claimed in claim 1 the step of adding a catalyst having an accelerating effect on the reaction.

6. In a process for making finely divided metal oxides and other metal compounds by means of a molten metallic raw material and a fine grained solid and hard substance, the step of mixing the whole quantity of the molten metallic raw material with a corresponding quantity of said substance so as to form a fine grained bulk which contains substantially the whole of said molten material in the form of a thin foil upon the separate grains and performing the said mixing in presence of a gaseous oxidizing agent and under increased pressure of said agent, the mixing and the chemical reaction being performed at a temperature lying between the melting-temperature of said raw material and the melting-temperature of said grained substance.

7. In a process as claimed in claim 6, in which the fine grained solid and hard substance is selected from a group consisting of minerals of the type of sand and gravel, stone, silicates, glass, porcelain, metals, metal compounds and metal alloys which are substantially non-reactive with the molten raw material.

8. In a process as claimed in claim 6 the further step of separating the metal compounds from the fine grained solid substance.

9. In a process of making finely divided red lead the step of mixing a quantity of molten lead with such a quantity of a fine grained solid and hard substance which is substantially non-reactive with the molten lead which is sufficient to form a fine grained bulk containing the molten lead in the state of finest division, subjecting the said bulk to an oxidizing reaction and separating the red lead from the fine grained solid substance.

10. In a process as claimed in claim 9 in which approximately equal quantities of molten lead and the fine grained solid and hard substance are used.

11. In a process as claimed in claim 9 the step of performing the said mixing and the said oxidizing reaction at a temperature lying between the melting temperature of lead and the melting temperature of the said grained substance.

12. In a process of making finely divided red lead the step of mixing a quantity of molten lead with an approximately equal quantity of a fine grained solid and hard substance so as to form a fine grained bulk, the said substance being selected from a group consisting of minerals of the type of sand, gravel, stone, silicates, glass, porcelain, metals, metal compounds and metal alloys which are substantially non-reactive with the molten lead, the further step of subjecting the said bulk to an oxidizing reaction and separating the red lead from the fine grained substance, the mixing and the oxidizing reaction being performed at a temperature lying above the melting point of lead and below the melting point of the said grained substance.

13. In a process of making finely divided red lead, the steps of mixing a quantity of molten lead with an approximately equal quantity of sand at a temperature not more than 100° C. above the melting point of the raw material, while passing a gaseous oxidizing agent into contact with the mass during admixture so as to form a fine grained bulk which contains all the molten lead in the form of a thin foil upon the grain, continuing the passage of the oxidizing agent until the said foil consists substantially of red lead, and separating the red lead from the sand.

14. In a process of making red lead the step of mixing a quantity of molten lead with a corresponding quantity of a fine grained solid and hard substance so as to form a fine grained bulk which contains substantially all the molten lead in the form of a thin foil upon the separate grains, subjecting the said bulk to an oxidizing reaction and discontinuing the oxidation at a lower degree of oxidation than that of the complete oxidation of the lead to red lead.

15. In a process as claimed in claim 14, the further step of extracting the lead which is not oxidized up to red lead and of separating the red lead from the fine grained solid substance.

16. In a process of making red lead as claimed in claim 14 the further step of extracting with acetic acid that part of the incompletely oxidized lead which does not constitute a component of the red lead and of further working up to a solid product, the lead acetate solution obtained by the treatment with acetic acid.

17. In a process of making red lead the step of mixing a quantity of molten lead with such a quantity of a fine grained solid and hard substance which is sufficient to form a fine grained bulk, said substance being substantially non-reactive with the molten lead, subjecting the said bulk to an oxidizing reaction, the mixing and the said reaction being performed at a temperature lying between the melting temperature of the lead and the melting temperature of said grained substance, discontinuing the oxidation at a lower degree of oxidation than that of the complete oxidation of the lead to red lead and extracting the incompletely oxidized lead with a suitable dissolvant.

18. In a process as claimed in claim 17, in which the fine grained solid and hard substance is selected from a group consisting of minerals of the type of sand and gravel, stone, silicates, glass, porcelain, metals, metal compounds and metal alloys which are substantially non-reactive with the molten raw material.

19. In a process as claimed in claim 17, in which said fine grained, solid and hard substance consists of a mineral which is substantially non-reactive with the molten raw material.

20. In a process as claimed in claim 1 the further step of separating the metal compounds from the fine grained solid substance.

21. In a process as claimed in claim 1 in which approximately equal quantities of the raw material in molten condition and the fine grained solid, hard substance are used.

PAUL BEYERSDORFER.